United States Patent
Park et al.

(10) Patent No.: US 12,321,816 B2
(45) Date of Patent: Jun. 3, 2025

(54) BATTERY CELL TRACKING DEVICE

(71) Applicant: LG ENERGY SOLUTION, LTD., Seoul (KR)

(72) Inventors: Kyoungchan Park, Daejeon (KR); Gun Hong Park, Daejeon (KR); Tae Kwang Jung, Daejeon (KR); Dong Wook Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/290,121

(22) PCT Filed: Apr. 10, 2023

(86) PCT No.: PCT/KR2023/004776
§ 371 (c)(1),
(2) Date: Nov. 9, 2023

(87) PCT Pub. No.: WO2023/200194
PCT Pub. Date: Oct. 19, 2023

(65) Prior Publication Data
US 2024/0242046 A1    Jul. 18, 2024

(30) Foreign Application Priority Data

Apr. 15, 2022    (KR) .................. 10-2022-0046805
Apr. 7, 2023     (KR) .................. 10-2023-0045983

(51) Int. Cl.
*G06K 7/10*     (2006.01)
*G06K 19/06*    (2006.01)
(Continued)

(52) U.S. Cl.
CPC ..... *G06K 7/10831* (2013.01); *G06K 7/10564* (2013.01); *G06K 19/06028* (2013.01); *H01M 10/0422* (2013.01); *H01M 50/256* (2021.01)

(58) Field of Classification Search
CPC .......... G06K 7/10831; G06K 7/10564; G06K 19/06028; G06K 7/10613; G06K 7/10702;
(Continued)

(56) References Cited

U.S. PATENT DOCUMENTS

| | | | | |
|---|---|---|---|---|
| 4,351,437 A | * | 9/1982 | Long | A01D 33/04 209/939 |
| 4,493,420 A | * | 1/1985 | Dennis | G06T 7/0004 209/939 |

(Continued)

FOREIGN PATENT DOCUMENTS

| | | |
|---|---|---|
| CN | 111403800 A | 7/2020 |
| EP | 3 593 272 B1 | 1/2021 |

(Continued)

OTHER PUBLICATIONS

International Search Report for PCT/KR2023/004776 mailed on Jul. 10, 2023.
(Continued)

*Primary Examiner* — Thien M Le
*Assistant Examiner* — Asifa Habib
(74) *Attorney, Agent, or Firm* — Birch, Stewart, Kolasch & Birch, LLP

(57) ABSTRACT

Discussed is a cell tracking device that can include a transfer section configured to transfer a plurality of battery cells; and a reading section arranged on the transfer section and configured to read a marking part including information unique to each of the plurality of battery cells, wherein the reading section comprises a light source that radiates light on the marking part; a first mirror located adjacent to the marking part and illuminating a first image of the marking part; and a second mirror located at a central part of the
(Continued)

reading section and illuminating the first image of the marking part illuminated on the first mirror.

16 Claims, 6 Drawing Sheets

(51) Int. Cl.
   *H01M 10/04* (2006.01)
   *H01M 50/256* (2021.01)
(58) Field of Classification Search
   CPC .......... H01M 10/0422; H01M 50/256; H01M 10/42; H01M 50/213; H01M 50/107; Y02E 60/10
   See application file for complete search history.

(56) References Cited

U.S. PATENT DOCUMENTS

| | | | |
|---|---|---|---|
| 6,588,669 B1 | 7/2003 | Claus et al. | |
| 7,915,860 B2* | 3/2011 | Quint | H01M 10/06 |
| | | | 324/426 |
| 8,079,523 B2 | 12/2011 | Barkan | |
| 8,866,443 B2* | 10/2014 | Abe | G01R 31/367 |
| | | | 320/132 |
| 10,367,181 B2* | 7/2019 | Shishida | H01M 4/131 |
| 11,605,956 B2* | 3/2023 | Baarman | H04B 5/72 |
| 2006/0261780 A1 | 11/2006 | Edington | H01M 10/48 |
| | | | 320/130 |
| 2012/0257054 A1* | 10/2012 | Maurin | G01N 21/9508 |
| | | | 348/143 |
| 2012/0299721 A1* | 11/2012 | Jones | G01R 31/3835 |
| | | | 340/521 |
| 2014/0280073 A1* | 9/2014 | Sutton | G06F 16/25 |
| | | | 707/722 |
| 2015/0048836 A1* | 2/2015 | Guthrie | H01M 6/5083 |
| | | | 324/427 |
| 2016/0232736 A1* | 8/2016 | Holtappels | H01M 50/514 |
| 2017/0343483 A1* | 11/2017 | Piana | B65G 17/26 |
| 2018/0034068 A1* | 2/2018 | Perry | H01M 10/54 |
| 2018/0074130 A1* | 3/2018 | Jeung | G01R 31/396 |
| 2018/0233729 A1* | 8/2018 | Liimatainen | H01M 50/491 |
| 2019/0049520 A1* | 2/2019 | Velev | H01M 10/4285 |
| 2019/0113911 A1* | 4/2019 | Hamaya | G05B 23/0213 |
| 2019/0131617 A1* | 5/2019 | Ahn | H01M 4/0404 |
| 2020/0233034 A1* | 7/2020 | Velev | G01R 31/385 |
| 2022/0109956 A1* | 4/2022 | Volkerink | H02J 7/005 |
| 2022/0266398 A1* | 8/2022 | Kim | H01M 10/04 |
| 2022/0319301 A1* | 10/2022 | Krejcarek | G08B 13/2431 |
| 2022/0416286 A1* | 12/2022 | Park | H01M 10/0422 |
| 2023/0253542 A1* | 8/2023 | Hughes | H01M 10/0404 |
| | | | 29/623.5 |
| 2023/0341471 A1* | 10/2023 | Zhang | G01R 31/3648 |
| 2023/0395947 A1* | 12/2023 | Stojanovski | H01M 10/0413 |
| 2024/0097218 A1* | 3/2024 | Sim | H01M 4/0404 |

FOREIGN PATENT DOCUMENTS

| | | |
|---|---|---|
| EP | 4 220 811 A1 | 8/2023 |
| JP | 2004-325285 A | 11/2004 |
| JP | 2006-234725 A | 9/2006 |
| JP | 2006-338244 A | 12/2006 |
| JP | 2011-210663 A | 10/2011 |
| KR | 10-2006-0027250 A | 3/2006 |
| KR | 10-2011-0018080 A | 2/2011 |
| KR | 10-1272556 B1 | 6/2013 |
| KR | 10-2015-0051657 A | 5/2015 |
| KR | 10-2016-0143068 A | 12/2016 |
| KR | 10-2020-0144385 A | 12/2020 |
| KR | 10-2021-0117016 A | 9/2021 |
| KR | 10-2022-0020123 A | 2/2022 |
| KR | 10-2022-0039264 A | 3/2022 |

OTHER PUBLICATIONS

Japanese Office Action for Japanese Application No. 2023-563966, dated Nov. 19, 2024, with English translation.
Extended European Search Report for European Application No. 23788544.7, dated Sep. 17, 2024.

* cited by examiner

[FIG. 1]
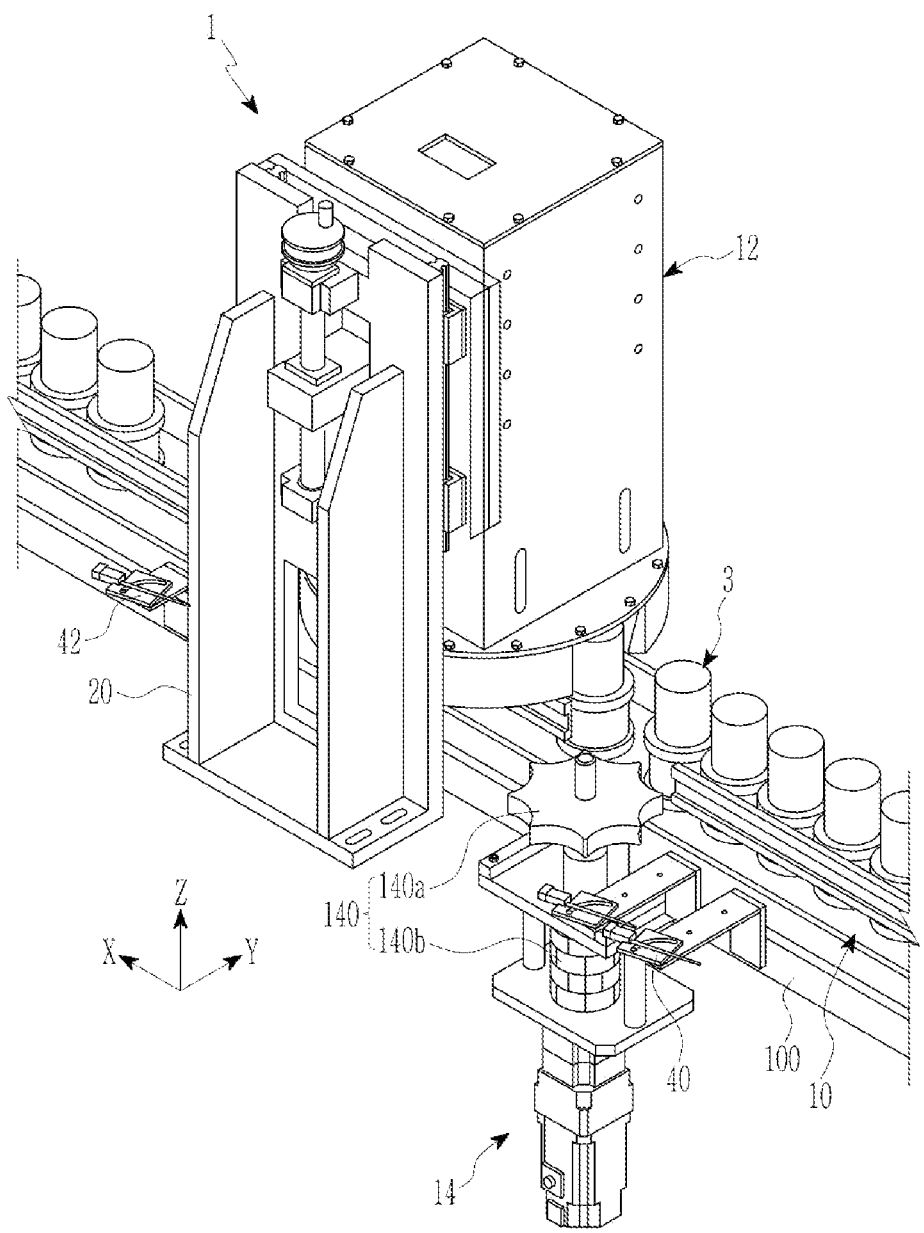

[FIG. 2]
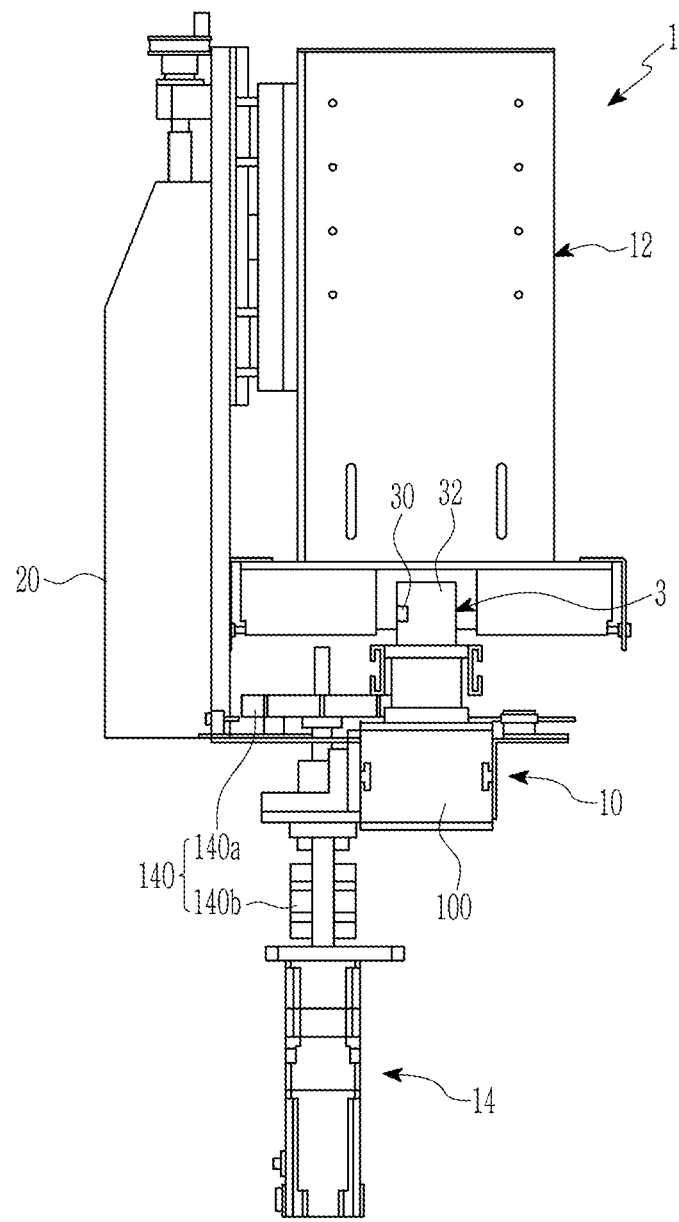

[FIG. 3]
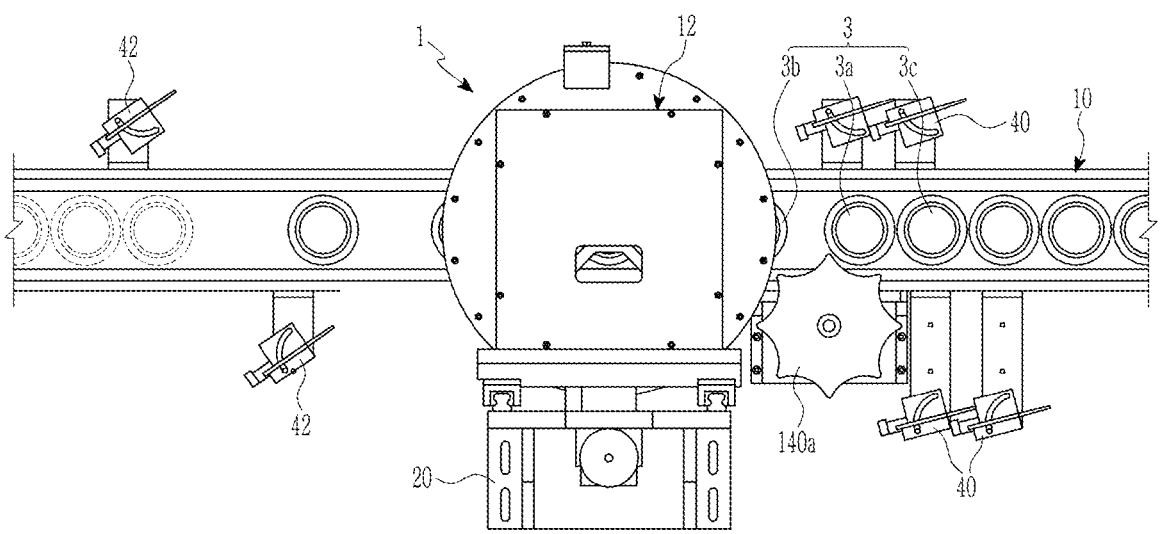

[FIG. 4]
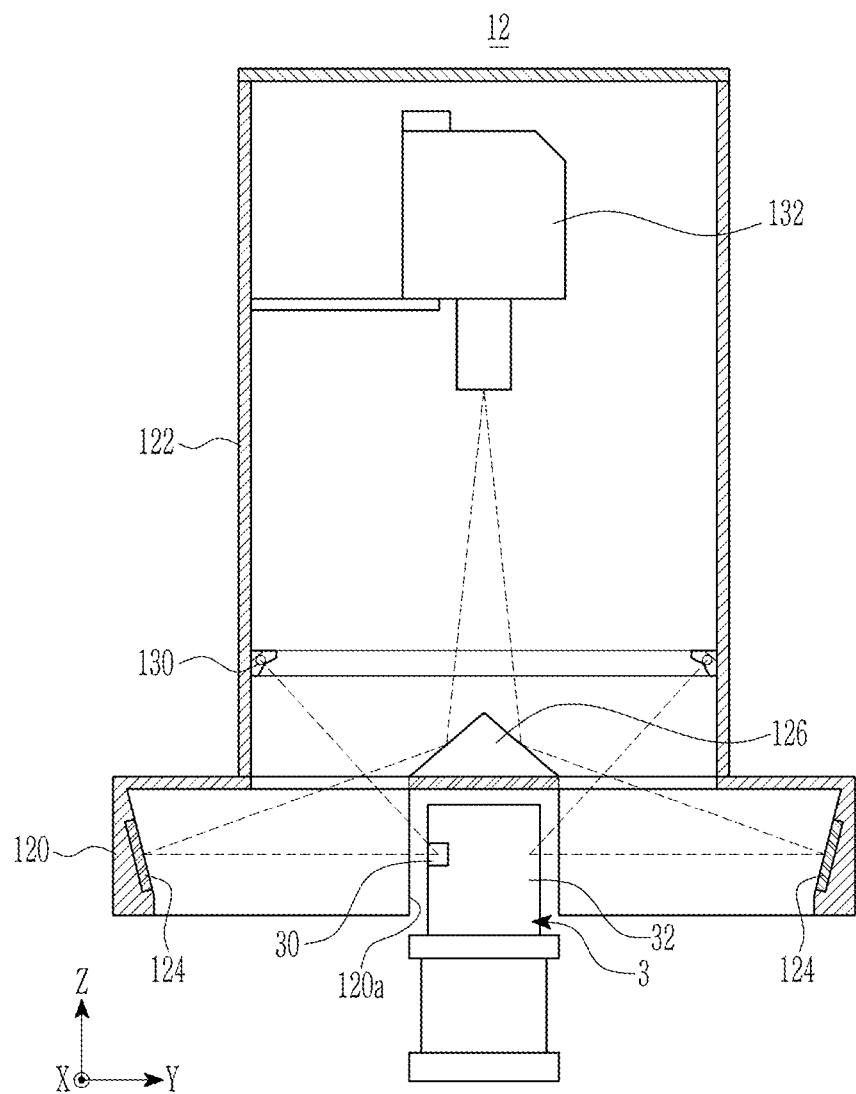

【FIG. 5】
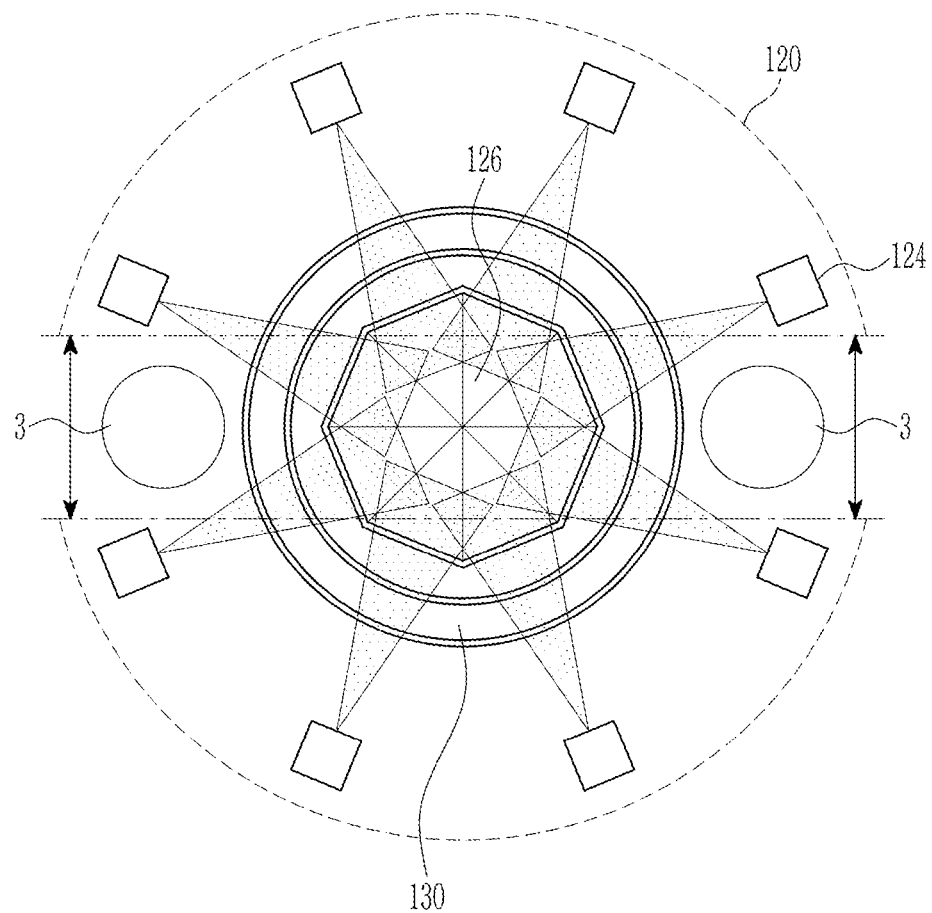

[FIG. 6]
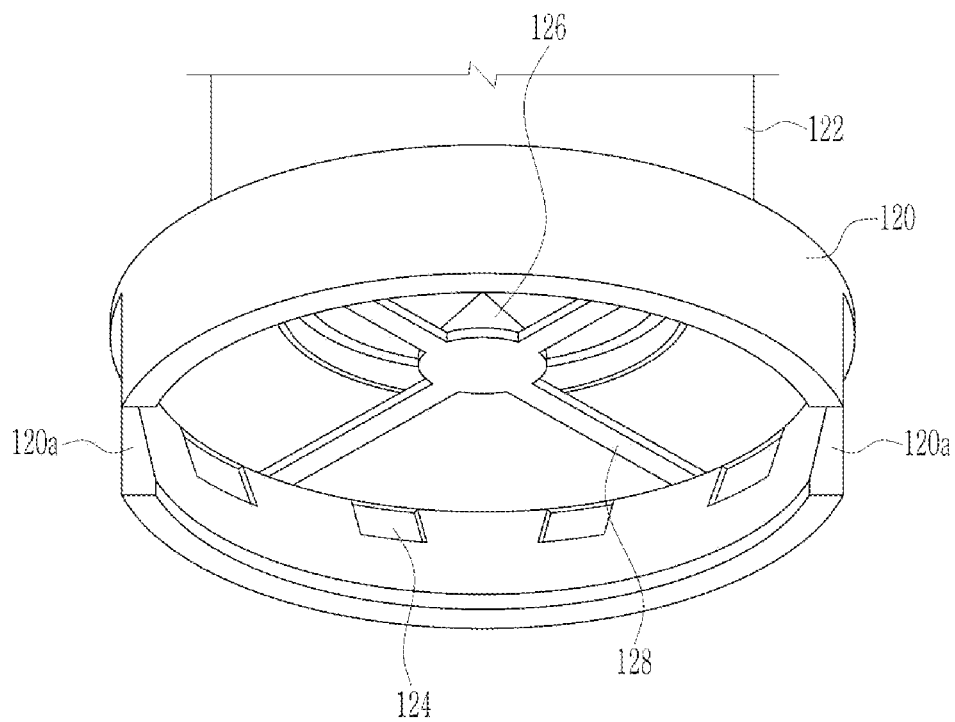

BATTERY CELL TRACKING DEVICE

CROSS CITATION WITH RELATED APPLICATION(S)

This application claims the benefit of Korean Patent Application No. 10-2022-0046805 filed on Apr. 15, 2022 and Korean Patent Application No. 10-2023-0045983 filed on Apr. 7, 2023 in the Korean Intellectual Property Office, the disclosures of which are hereby incorporated by reference in their entirety.

TECHNICAL FIELD

The present disclosure relates to a battery cell tracking device, and more particularly, to a battery cell tracking device having improved recognition performance for an area marked with information unique to a battery cell.

BACKGROUND

With the technology development and increased demand for mobile devices, demand for secondary batteries as energy sources have been rapidly increasing. In particular, a secondary battery has attracted considerable attention as an energy source for power-driven devices, such as an electric bicycle, an electric vehicle, and a hybrid electric vehicle, as well as an energy source for mobile devices, such as a mobile phone, a digital camera, a laptop computer and a wearable device.

In small mobile devices, one, or two, or three battery cells are used per device, while medium- or large-sized devices such as vehicles require high power and large capacity. Therefore, a medium- or large-sized battery module having a plurality of battery cells electrically connected to one another is used.

Here, each battery cell can be subjected to a marking process for displaying product information and the like on a part of the components (e.g., cans) of the battery cell in order to display a history in the manufacturing process. More specifically, the marking process may be a process of marking a part of the components of the battery cell in the form of a barcode or the like. Accordingly, when a quality problem of the battery cell occurs in the manufacturing process of the battery cell, the traceability for each battery cell can be secured based on the barcode.

In particular, it is necessary to reintroduce to a process a battery cell, which is discriminated that it has a failure in the manufacturing process of the battery cell, or to secure traceability of the battery cell from the viewpoint of the quality control of the battery cell.

By the way, when reading a barcode provided on the battery cell, if the barcode is not provided while maintaining a fixed position, a battery cell tracking device must be configured so that the barcode can read in various directions.

In such a case, the configuration of the battery cell tracking device becomes complicated. To prevent this, the barcode can be provided at multiple locations on the battery cell, thereby allowing the barcode to be read through one reading unit, but in this case, since a plurality of barcodes are printed, it is disadvantageous from the viewpoints of management and cost.

DETAILED DESCRIPTION OF THE INVENTION

Technical Problem

It is an object of the present disclosure to provide a battery cell tracking device with a simple configuration that can not only recognize an area marked with information unique to a battery cell but also improve recognition performance.

The objects of the present disclosure are not limited to the foregoing objects, and any other objects and advantages not mentioned herein should be clearly understood by those skilled in the art from the following description and the accompanying drawing.

Technical Solution

According to one embodiment of the present disclosure, there is provided a battery cell tracking device including: a transfer section configured to transfer a plurality of battery cells; and a reading section arranged on the transfer section and configured to read a marking part including information unique to each of the plurality of battery cells, wherein the reading section includes a light source that radiates light on the marking part; a first mirror located adjacent to the marking part and illuminating a first image of the marking part; and a second mirror located at a central part of the reading section and illuminating the first image of the marking part illuminated on the first mirror.

The reading section may further include a camera that captures a second image of the marking part illuminated on the second mirror and transmits image data thereof to an image processing device.

The reading section may further include a first housing including a cut-out part; and a second housing installed on the first housing, wherein the first mirror is arranged at regular intervals in the first housing, and wherein the second mirror, the light source and the camera are arranged within the second housing.

The second mirror, the light source and the camera may be sequentially arranged along a longitudinal direction of the second housing.

The second mirror may have a polygonal shape on a plane.

When the first mirror is arranged at N locations (N is a natural number) along an inner peripheral surface of the first housing, the second mirror may have an N-polygonal shape on the plane.

The second mirror may have a pyramid shape.

The pyramid shape of the second mirror may be a tetragonal pyramid shape or an octagonal pyramid shape.

The battery cell tracking device may further include an adjusting part that is connected to the transfer section and adjusts an interval between the plurality of battery cells.

The adjusting part may include an adjusting unit that determines an interval between one battery cell and other adjacent battery cells while making contact with the one battery cell among the plurality of battery cells.

The adjusting unit may include a toothed wheel rotatably installed on a guide rail of the transfer section; and a drive motor coupled to the toothed wheel.

The battery cell tracking device may include a rotating sensor that is installed on the guide rail to detect a battery cell located toward the reading section from among the plurality of battery cells and configured to transmit a signal for rotating the toothed wheel to a control part.

Further, the battery cell tracking device may include a stopping sensor that is installed on the guide rail to detect a battery cell spaced away from the reading section and configured to transmit a signal for stopping the toothed wheel to the control part.

Each battery cell of the plurality of battery cells may be a cylindrical battery cell.

Advantageous Effects

According to embodiments, the battery cell tracking device of the present disclosure can favorably recognize information regarding the marking part through one reading section regardless of the position of the marking part provided on the battery cell.

In addition, when reading the marking part for one battery cell, the interval between the battery cells can be maintained so as to prevent interference due to other battery cells, thereby improving the reading recognition rate of the marking part.

The effects of the present disclosure are not limited to the effects mentioned above and additional other effects not mentioned above will be clearly understood from the detailed description and the accompanying drawings by those skilled in the art.

BRIEF DESCRIPTION OF THE DRAWINGS

FIG. 1 is a perspective view showing a battery cell tracking device according to an embodiment of the present disclosure;

FIG. 2 is a side view showing the battery cell tracking device of FIG. 1;

FIG. 3 is a plan view showing the battery cell tracking device of FIG. 1;

FIG. 4 is a cross-sectional view showing a reading section of the battery cell tracking device of FIG. 1;

FIG. 5 is a schematic diagram showing a first mirror and a second mirror of the reading section of FIG. 4; and FIG. 6 is a diagram for explaining the second mirror of the reading section of FIG. 4.

DETAILED DESCRIPTION OF THE EMBODIMENTS

Hereinafter, various embodiments of the present disclosure will be described in detail with reference to the accompanying drawings so that those skilled in the art can easily carry out them. The present disclosure may be modified in various different ways, and is not limited to the embodiments set forth herein.

Portions that are irrelevant to the description will be omitted to clearly describe the present disclosure, and like reference numerals designate like elements throughout the description.

Further, since the size and thickness of each element shown in the accompanying drawing are arbitrarily illustrated for convenience of explanation, it would be obvious that the present disclosure is not necessarily limited to those illustrated in the drawings. In the drawings, the thickness are exaggerated for clearly expressing several layers and regions. In the drawings, for convenience of explanation, the thicknesses of some layer and regions are exaggerated.

Further, throughout the description, when a portion is referred to as "including" or "comprising" a certain component, it means that the portion can further include other components, without excluding the other components, unless otherwise stated.

Further, throughout the description, when it is referred to as "planar", it means when a target portion is viewed from the upper side, and when it is referred to as "cross-sec-tional", it means when a target portion is viewed from the side of a cross section cut vertically.

The battery cell tracking device according to one embodiment of the present disclosure allows battery cells that are moved in-line at high speed to be transferred while maintaining a prescribed interval, and is configured to read a marking part (e.g., barcode) of the battery cell and transmit image data to an image processing device.

In this embodiment, the battery cell is provided as a cylindrical battery cell, and a barcode as a marking part can be provided on a part of the side surface of the can of the cylindrical battery cell. The corresponding battery cell is housed in the electrode assembly inside the can, and is in a state where the cap plate is assembled to the opening of the can, and it is individually housed in the carrier, so that the information of the marking part is inspected. The configuration of such a battery cell is only one illustrative embodiment, and the present disclosure is not necessarily limited thereto.

FIG. 1 is a perspective view showing a battery cell tracking device according to an embodiment of the present disclosure. FIG. 2 is a side view showing the battery cell tracking device of FIG. 1. FIG. 3 is a plan view showing the battery cell tracking device of FIG. 1.

As shown in FIGS. 1 to 3, the battery cell tracking device 1 according to the embodiment includes a transfer section 10 that transfers a plurality of battery cells 3. In this embodiment, the plurality of battery cells 3 are arranged in-line and are continuously transferred along one direction (X) by a conveyor that is the transfer section 10.

Also, the battery cell tracking device 1 according to the embodiment includes a reading section 12 that is arranged on the transfer section 10 and reads the marking parts 30 provided on the plurality of battery cells 3.

In this embodiment, the reading part 12 is located on an upper part of the battery cell 3, and is installed to be able to move up and down on a bracket 20 fixed to a support (not shown).

The battery cell 3 is transferred so as to pass through the lower part of the reading section 12 by the transfer section 10, and when it is located directly below the reading section 12, the information possessed by the marking part 30 is inspected by the reading section 12.

The battery cells 3 may be provided as cylindrical battery cells as described above. Moreover, the battery cell 3 may have the size of a high-output and large-capacity battery cell that can be applied to an electric vehicle or the like.

The marking part 30 can be formed of a barcode printed on the surface of a can 32 of the battery cell 3, and information such as a date of production can be displayed on the barcode.

The reading section 12 may be configured to capture and read an image of the marking part 30 illuminated on the mirror by a camera.

FIG. 4 is a cross-sectional view showing a reading section according to the present embodiment. As shown in FIGS. 1 to 4, the reading section 12 includes a first housing 120 and a second housing 122 connected to an upper part of the first housing 120.

The first housing 120 arranged on the transfer section 10 includes a body having an internal space while having a circular shape. A cut-out part 120a is arranged opposite to the first housing 120, wherein the battery cell 3 transferred to the transfer section 10 may pass through the internal space of the first housing 120 through the cut-out part 120a. Therefore, the cut-out part 120a is preferably provided with a width larger than the diameter of the battery cell 3.

First mirrors 124, which are one of the components of the reading section 12, are arranged at equal intervals on the inner peripheral surface of the first housing 120, and fixed to the first housing 120. Here, the first mirror 124 is inclined so that an angle between the reflective surface and an imaginary plane (X-Y plane) forms an obtuse angle. Referring to FIG. 4, the first mirror 124 is inclinedly disposed that the upper part faces the outside of the first housing 120 compared to the lower part.

In this embodiment, as shown in FIG. 5, the first mirrors 124 are disposed at eight locations along the inner peripheral surface of the first housing 120. Of course, the number of first mirrors 124 is not limited thereto, and can be appropriately adjusted. For example, the first mirror 124 may be arranged at N locations (N is a natural number) along the inner peripheral surface of the first housing 120.

The second housing 122 includes a body having an internal space while having a rectangular parallelepiped shape. A second mirror 126, which is one of the components of the reaction section 12, is disposed at the central part in the internal space of the second housing 122. The second mirror 126 may be fixedly installed on a cross-shaped support beam 128 connected to the first and second housings 120 and 122 (see FIG. 6).

In the present embodiment, the second mirror 126 may have a polygonal shape when viewed from a plane. In other words, a cross-sectional shape of the second mirror 126 along the XY plane of FIG. 4 may be polygonal. According to this embodiment, when the first mirror 124 is arranged at N locations (N is a natural number), the second mirror 126 may have an N-polygonal shape on a plane.

Although shown in an octagonal shape in FIG. 4, the shape of the second mirror 126 can vary depending on the number of first mirrors 124. Additionally, the second mirror 126 may be provided in a polygonal pyramid shape. The polygonal pyramid shape of the second mirror 126 may be formed so as to correspond to the number of the first mirrors 124. In this embodiment, while the cylindrical battery cell 3 is shown, the second mirror 126 is described as having an octagonal pyramid shape, but when tracking a battery cell in the form of a hexahedral cell, the first mirrors 124 may be placed at four locations, and the second mirrors 126 may be in the shape of a quadrangular pyramid.

Further, a light source 130 and a camera 132, which are components of the reading section 12, are installed in the internal space of the second housing 122.

The light source 130 radiates light on the marking part 30 of the battery cell 3 and allows the image of the marking part 30 to illuminate the first mirror 124. In this embodiment, the light source 130 is provided as an annular light having LEDs. Here, the LED may be arranged in the body such that the illumination angle can be directed toward the marking part 30. Such a light source 130 may be fixed to the inner wall of the second housing 122 so as to be arranged on an upper part of the first mirror 124 and the second mirror 126 when viewed with reference to FIG. 4.

The camera 132 may be fixed to the second housing 122 such that it is disposed at the central part of the second housing 122. In the present embodiment, the camera 132 is located at the uppermost part of the internal space of the second housing 122 along the longitudinal direction z of the second housing 122, and the light source 130 is located between the camera 132 and the second mirror 126, that is, on the upper part of the first mirror 124 and the second mirror 126 when viewed through FIG. 4.

When the battery cell 3 enters the internal space of the first housing 120 through the cut-out part 120*a* and passes through the internal space, the battery cell 3 is irradiated with light from the light source 130, so that the image of the marking part 30 of the battery cell 3 is illuminated on the first mirror 124. At this time, since the first mirrors 124 are arranged radially around the battery cells 3. Thus, even if all of the plurality of battery cells 3 are not transferred to the internal space of the first housing 120 by maintaining the marking part 30 at a fixed position, the image of the marking part can be illuminated on any of the first mirrors 124.

Of course, when the plurality of battery cells 3 pass through the internal space of the first housing 120 by locating each marking part 30 at a prescribed position while maintaining a constant interval, the accuracy of reading for the marking part 30 can be improved. For example, when the interval between the battery cells 3 is narrower or wider than a desired interval, interference may occur, and thus the accuracy of reading may deteriorate.

The image of the marking part 30 illuminated on the first mirror 124 is projected onto the second mirror 126, and the image of the marking part 30 illuminated on the second mirror 126 can be captured by a camera 132. At this time, by arranging the second mirror 126 at the central part of the reading section 12, the image of the marking part 30 illuminated on the plurality of first mirrors 124 is accurately projected on the second mirror 126, so that the reading recognition rate of the marking part 30 can be improved.

The camera 132 can transmit image data of the image of the captured marking part 30 to an image processing device (not shown) to read the information of the marking part 30.

Meanwhile, the battery cell tracking device 1 according to the embodiment includes an adjusting part 14 that is connected to the transfer section 10 and adjusts an interval between the plurality of battery cells 3 supplied to the reading section 12.

Referring to FIGS. 1 to 3, the adjusting part 14 includes an adjusting unit 140 that determines the interval between the one battery cell 3*a* and other adjacent battery cells 3*b* and 3*c* while making contact with one battery cell 3*a* among the plurality of battery cells 3.

In the present embodiment, the adjusting unit 140 includes a toothed wheel 140*a* rotatably installed on the guide rail 100 of the transfer section 10, and a drive motor 140*b* connected to the toothed wheel 140*a* and driving the toothed wheel 140*a*. The drive motor 140*b* can be electrically connected to a control part (not shown) to rotate the toothed wheel 140*a* under the control of the control part.

In the present embodiment, the toothed wheel 140*a* has eight teeth, and a concave part 142*a* between adjacent teeth has a curvature corresponding to the outer peripheral surface of the can 32 of the battery cell 3. The toothed wheel 140*a* is rotatably fixed and located on the guide rail 100 so that one concave part 142*a* can make close contact with the outer peripheral surface of the can of one battery cell 3*a* during rotation.

The adjusting unit 140 may adjust the interval so that the adjacent battery cells 3 maintain a constant interval when the plurality of battery cells 3 are directed toward the reading section 12 at high speed by the transfer section 10.

Herein, the constant interval can be maintained to the extent that interference by other battery cells does not occur when reading information of the marking unit for one battery cell by the reading section 12 as described above.

For example, when one battery cell is located at the central part of the reading section 12 (at this time, the reading section acts on the above marking part), other battery cells located in front and rear of this one battery cell span the cut-out part 120*a* of the first housing 120 at the above regular intervals, that is, some of the other battery cells are located inside the first housing 120, and the other part is located outside the first housing 120.

This constant interval can be achieved by transferring the plurality of battery cells 3 at a high speed by the transfer section, and then slowing down the transfer speed while being bound to and transferred by the concave part 142*a* of the rotating toothed wheel 140*a*.

Meanwhile, a battery cell detecting sensor for turning on/off the rotation of the toothed wheel 140*a* can be installed on the guide rail 100 of the transfer section 10.

In this embodiment, the battery cell detecting sensor comprises a rotating sensor 40 for detecting the battery cell toward the reading section 12 and transmitting a signal for rotating the toothed wheel 140*a* to the control part; and a stopping sensor 42 for stopping the rotation of the toothed wheel 140*a* by detecting a battery cell spaced away from the reading part 12.

When the rotating sensor 40 detects only one of at least two battery cells 3*a* and 3*b* entering toward the reading section 12, the battery cells are transferred by the transfer section 10. In the case of detecting both of the two battery cells 3*a* and 3*b*, the corresponding detection signal is transmitted to the control part to drive the drive motor 140*b* under the control of the control part so that the toothed wheel 140*a* rotates.

On the other hand, when the stopping sensor 42 detects the battery cell passing through the reading section 12 even after a certain period of time (e.g., 0.several seconds), the corresponding detection signal is transmitted to the control part to stop the drive motor 140*b* by the control part so that the rotation of the toothed wheel 140*a* is stopped. Stopping the driving of the drive motor 140*b*/toothed wheel 140*a* by the stopping sensor 42 is performed to prevent the battery cell from being put into the next process in the in-line facility, if a problem occurs in the process following the reading process in the reading section 12, and the battery cell cannot proceed continuously and is pushed (see the battery cell shown by the dotted line on the left side of FIG. 3).

Although the invention has been described in detail above with reference to preferred embodiments thereof, the scope of the present disclosure is not limited thereto, and various modifications and improvements can be made by those skilled in the art using the basic concepts of the present disclosure as defined in the appended claims, which also falls within the scope of the present disclosure.

The invention claimed is:

1. A battery cell tracking device comprising:
    a transfer section configured to transfer a plurality of battery cells; and
    a reading section arranged on the transfer section and configured to read a mark including information unique to each of the plurality of battery cells,
    wherein the reading section comprises:
        a light source configured to radiate light on the mark;
        a first mirror located adjacent to the mark and configured to illuminate a first image of the mark; and
        a second mirror located at a central part of the reading section and configured to illuminate the illuminated first image of the mark on the first mirror,
    wherein the first mirror is inclined relative to the transfer section, and
    wherein the second mirror is located directly above one of the plurality of battery cells having the mark read in the central part of the transfer section.

2. The battery cell tracking device of claim 1, wherein:
    the reading section further comprises a camera that captures a second image of the mark illuminated on the second mirror and transmits image data thereof to an image processing device.

3. The battery cell tracking device of claim 2, wherein:
    the reading section further comprises,
        a first housing including a cut-out part; and
        a second housing installed on the first housing,
    wherein the first mirror is arranged at regular intervals in the first housing, and
    wherein the second mirror, the light source and the camera are arranged within the second housing.

4. The battery cell tracking device of claim 3, wherein:
    the second mirror, the light source and the camera are sequentially arranged along a longitudinal direction of the second housing.

5. The battery cell tracking device of claim 3, wherein:
    the second mirror has a polygonal shape on a plane.

6. The battery cell tracking device of claim 5, wherein:
    when the first mirror is arranged at N locations along an inner peripheral surface of the first housing, and the second mirror has an N-polygonal shape on the plane, where N is a natural number greater than zero.

7. The battery cell tracking device of claim 6, wherein:
    the second mirror has a pyramid shape.

8. The battery cell tracking device of claim 7, wherein:
    the pyramid shape of the second mirror is a tetragonal pyramid shape or an octagonal pyramid shape.

9. The battery cell tracking device of claim 1, further comprising:
    an adjusting part connected to the transfer section and configured to adjust an interval between the plurality of battery cells.

10. The battery cell tracking device of claim 9, wherein:
    the adjusting part comprises:
        an adjusting unit configured to determine an interval between one battery cell and another adjacent battery cell while making contact with the one battery cell among the plurality of battery cells.

11. The battery cell tracking device of claim 10, wherein:
    the adjusting unit comprises:
        a toothed wheel rotatably installed on a guide rail of the transfer section; and
        a drive motor coupled to the toothed wheel.

12. The battery cell tracking device of claim 11, comprising:
    a rotating sensor that is installed on the guide rail to detect a battery cell located toward the reading section from among the plurality of battery cells, the rotating sensor being configured to transmit a signal for rotating the toothed wheel to a control part.

13. The battery cell tracking device of claim 11, comprising:
    a stopping sensor that is installed on the guide rail to detect a battery cell spaced away from the reading section from among the plurality of battery cells, the stopping sensor being configured to transmit a signal for stopping the toothed wheel to the control part.

14. The battery cell tracking device of claim 11, wherein:
    each of the plurality of battery cells is a cylindrical battery cell.

15. The battery cell tracking device of claim 1, wherein:
    the first mirror is coplanar to the one of the plurality of battery cells having the mark read in the central part of the transfer section.

16. The battery cell tracking device of claim 1, wherein:
the first mirror is inclined to directly face the second mirror.

\* \* \* \* \*